UNITED STATES PATENT OFFICE.

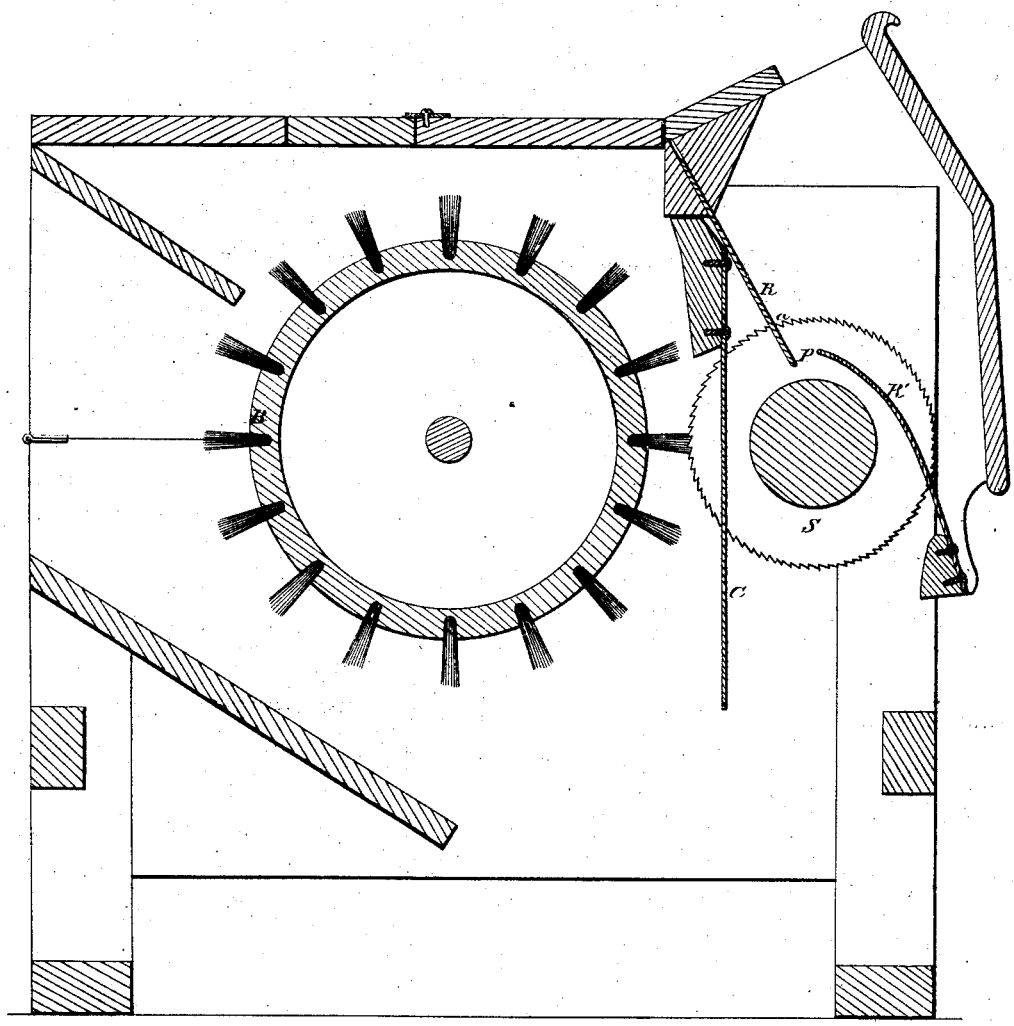

JAMES F. ORR, OF ORRVILLE, ALABAMA.

IMPROVEMENT IN COTTON-GINS.

Specification forming part of Letters Patent No. 16,394, dated January 13, 1857.

*To all whom it may concern:*

Be it known that I, JAMES F. ORR, of Orrville, in the county of Dallas and State of Alabama, have invented a new and useful Improvement in Cotton-Gins; and I do hereby declare that the following is a full, clear, and exact description of the construction and operation of the same, reference being had to the annexed drawing, forming part of this specification, in which the figure represents a vertical longitudinal section of a cotton-gin with my improvement.

The nature of my invention consists in constructing the gin with a double series of short ribs, so placed that the cotton shall be drawn through the upper series, and that the upper extremities of the lower ribs shall be a short distance in front of the lower extremities of the upper ribs, leaving thereby openings between the upper and lower ribs, a short distance below the points at which the cotton is drawn through the upper ribs. A portion of the seed passes through these openings, and the discharge is thereby facilitated.

In the drawing, S is one of the saws, and B the brush-cylinder. R is the upper rib, passing down toward the saw-cylinder, and R' the lower rib, curving upward and terminating in advance of rib R, a short distance below the point $a$, at which the cotton is drawn through the upper ribs. This leaves a passage, P, between ribs R and R', and between the saw-cylinder and rib R', for a portion of the seed to pass through, the remainder passing over the lower rib in the usual manner. The straight ribs C prevent the seed passing through opening P from being carried under the brushes.

The advantage of this construction consists in the rapid discharge of seed which it admits of, thereby greatly facilitating the operation of the machine.

What I claim, and desire to secure by Letters Patent, is—

The combination of the two short ribs R and R', the latter arranged in relation to the saw-cylinder, substantially as and for the purposes described.

In testimony whereof I have hereunto signed my name before two subscribing witnesses.

JAS. F. ORR.

Witnesses:
 GEO. PATTEN,
 JOHN S. HOLLINGSHEAD.